(12) United States Patent
Jia et al.

(10) Patent No.: US 7,487,219 B1
(45) Date of Patent: Feb. 3, 2009

(54) VIRTUAL STORAGE DEVICE FROM MULTIPLE ONLINE ACCOUNTS

(75) Inventors: Bin Jia, Winchester (GB); Guy Patrick Hindle, Southampton (GB); Mark Wilson, Southampton (GB); Anne Marie Workman, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/031,744

(22) Filed: Feb. 15, 2008

(51) Int. Cl.
*G06F 15/16* (2006.01)
*G06F 3/00* (2006.01)
*G06F 13/00* (2006.01)

(52) U.S. Cl. .............. 709/206; 709/219; 709/227; 719/320

(58) Field of Classification Search ......... 709/204–206, 709/217–219, 227–229; 711/100–114; 719/311–325
See application file for complete search history.

(56) References Cited

U.S. PATENT DOCUMENTS

| | | | |
|---|---|---|---|
| 5,606,685 A | 2/1997 | Frandeen | |
| 7,085,827 B2 | 8/2006 | Ishizaki et al. | |
| 7,099,912 B2 | 8/2006 | Ishizaki et al. | |
| 7,180,872 B2 | 2/2007 | Bailey et al. | |
| 2002/0133605 A1 * | 9/2002 | Khanna et al. | 709/229 |
| 2005/0153766 A1 | 7/2005 | Harmon | |
| 2007/0288247 A1 * | 12/2007 | Mackay | 705/1 |

OTHER PUBLICATIONS

Vombato Mail Drive © 2006 (accessed Sep. 25, 2008 from http://www.vombato.com/vombato.html).*
"GMail Drive Shell extention"—viksoe.dk, http://www.viksoe.dk/code/gmail.htm, published Oct. 4, 2004.

* cited by examiner

*Primary Examiner*—Joseph E Avellino
(74) *Attorney, Agent, or Firm*—MaxvalueIP, LLC

(57) ABSTRACT

One embodiment provides a single, universally available, potentially unlimited web-based storage space by the use of RAID technology over multiple, heterogeneous web-based accounts. Such a solution has the following advantages: the storage capacity of the virtual data space can be dynamically sized by adding additional accounts; unauthorized access to one account will not result in access to the entire data set; the use of multiple servers provides the potential for faster access to data than via a single server e.g. when access to one service is slow; and the use of multiple servers provides better resilience for data access, e.g. when one account is unavailable. Redundant storage of data lowers the chance of the loss of access to one account leading to the loss of the entire data set.

1 Claim, 3 Drawing Sheets

VIRTUAL STORAGE DEVICE FROM MULTIPLE ONLINE ACCOUNTS

BACKGROUND OF THE INVENTION

At present, available "data space" via the internet universally suffers from the following problems:

- web-based "disk space" accounts (e.g. e-mail, photos or music) provide users with a kind of storage, where the capacity of an account limits the amount of storage available;
- if an account is compromised, the intruder can access all the files/data that are contained in that account;
- should a user lose his/her credentials to an account or if the data held in that account is corrupted/lost by the host then that data may be lost to the user; and
- latency may be impacted, if the route to the account is poor for whatever reason.

Currently, there are no known solutions to these problems even though some existing internet-based storage solutions create virtual file system on top of the user's email account. They, for instance, enable the user to save and retrieve files stored on the email account directly from inside Windows® Explorer® but are unable to fully address the issues mentioned above.

On the other hand, a redundant array of inexpensive disks (RAID) technology is a solution that incorporates multiple disks to create a virtual disk with a large storage capacity. However, RAID only works for real disks. Certain existing services enable one to split a document into chunks, sent them by email to a particular email account, and then recombine the chunks from received emails, but none of them aggregates storage from multiple Internet storage services into a block storage device.

SUMMARY OF THE INVENTION

In one embodiment, the invention provides a single, universally available, potentially unlimited web-based storage space by the use of RAID technology over multiple, heterogeneous web-based accounts. RAID technology in this case encompasses (a) mirroring, the copying of data to more than one storage space; (b) striping, the splitting of data across more than one storage space; and (c) error correction, where redundant data such as parity is stored to provide fault tolerance by detecting and correcting problems. Such a solution will not suffer from the problems listed above, and it has the following advantages: the storage capacity of the virtual data space can be dynamically sized by adding additional accounts, unauthorized access to one account will not result in access to the entire data set, the use of multiple servers provides the potential for faster access to data than via a single server e.g. when one service's access is slow, and the use of multiple servers provides better resilience for data access, e.g. when one account is unavailable. Redundant storage of data lowers the chance of the loss of access to one account leading to the loss of the entire data set.

DETAILED DESCRIPTION OF THE PREFERRED EMBODIMENTS

Figure 1:
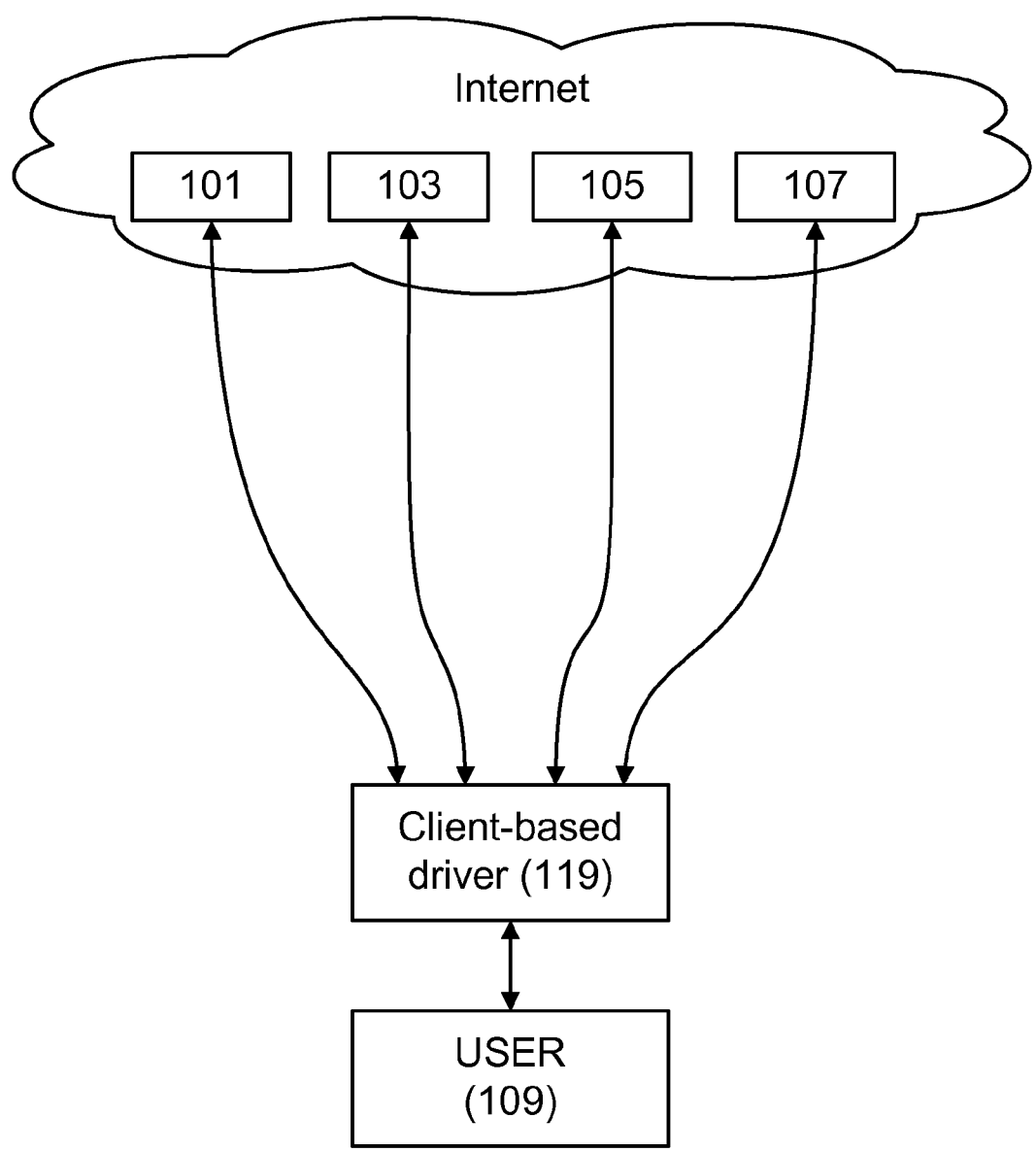
FIG. 1 is a schematic diagram of the main components of the virtual storage device.
Figure 2:
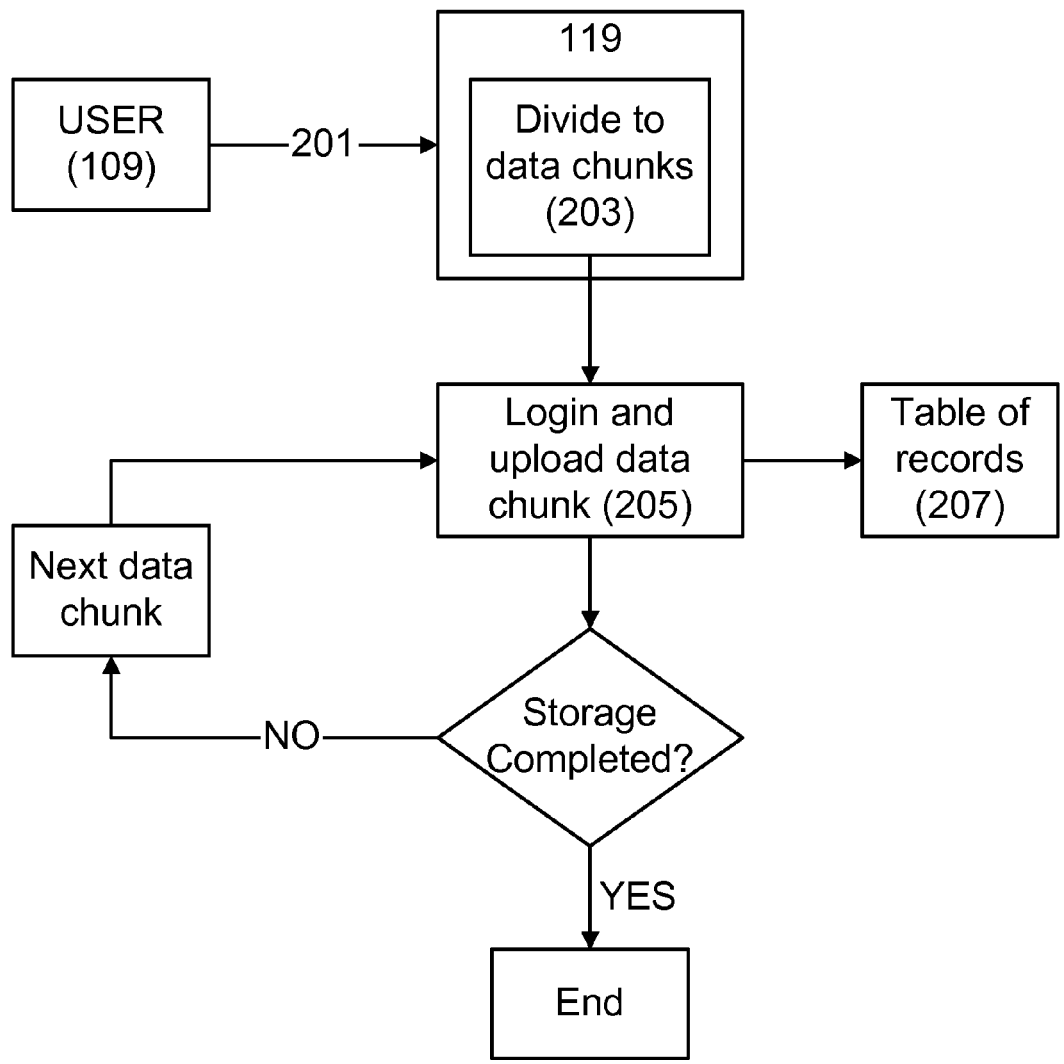
FIG. 2 is a data flow diagram showing the storage of a data block on the online storage accounts.

An embodiment of the invention is a driver that connects to multiple web-based accounts, e.g. email accounts. This driver stores the access key (user ID/password) of each account and automatically stores, retrieves, deletes, and backs up data by sending, receiving, and forwarding email. This driver provides the view of a normal block device to local OS such as Unix® or Windows®. When storing data, this driver automatically divides the data into multiple chunks and sends each chunk to an account via sending an email. Each email contains a topic that identifies the chunk of data. This driver maintains a table that records how one data block is divided and stored on what accounts and with what topics. In one embodiment, when retrieving data, this driver automatically checks the table and receives the emails with specific topics from specific accounts and assembles the chunks to one data block. When deleting data, the driver automatically looks up the table, finds the related emails on specific accounts and deletes the emails on the servers. When backing up data, the driver looks up the table, finds the related emails on specific accounts and forwards the email to new accounts that are used as backup storage.

Before accessing email accounts for the above operations, in one embodiment, the driver automatically logs on to the email servers. In one embodiment, the driver supports adding new accounts and removing existing accounts. The invention also covers other online storage facilities such as photos or music, e.g. Flickr™. While requiring accessing keys, all such types of accounts are utilized to provide basic storage operations. Furthermore, heterogeneous online-storages can be confederated into a virtual storage. For example, several emails, online images, or video accounts can be constructed into one virtual disk.

In one embodiment, mobile workers can access data from any public machine to enable them to travel without the need for a laptop. This is done by having the configurations and the table also stored (e.g. in an encrypted manner) and made accessible on-line at one or more locations. In one embodiment, data is backed up and retrieved, e.g. where low performance is not an issue and frequent access is not required.

An embodiment of the invention is client-based. It uses personal computer (PC) software to aggregate multiple Internet storage services into a resilient block storage device. Every user merely needs to install an agent program on his/her computer. In one embodiment, the on-line storage service becomes available with no dependency on any central storage servers or any other users. Even if the user's connections with some of online storage sites fail, the rest of available connection may still provide the storage.

An embodiment of invention uses the private accounts which can only be accessed by the user. This makes a safer approach than those that use the storage from other users' hard drives, because the other users cannot easily access the information protected by the user's IDs/passwords. An embodiment incorporates multiple heterogeneous non-generic resources, e.g. on-line email, image, video, or music online store system, which can be available on the web by wrapping these heterogeneous resources to create a virtual disk. In one embodiment, the users don't need to contribute their own storage for the federated system, i.e. the volume of the federated storage is only dependent on the number of on-line accounts and their capacities.

In an embodiment of this invention, a method of providing a virtual storage device, shown in FIG. 1, from a plurality of online storage accounts (103, 105, 107) is presented as shown in FIG. 1. The method comprises of a way to maintain an access key for each first online storage account of the plurality of online storage accounts (103-107) wherein the first online storage account has an account type and an account configuration (103-107 can have different account types/configurations). The account type is one of storage types, and the storage types comprise of email type, photo type, music type, and social network type. The access key is associated and private to a user (109), and the plurality of online storage accounts (103-107) is associated to the user (109).

In this embodiment, using a client-based driver (119) for aggregating the plurality of online storage accounts into the virtual storage device, the client-based driver provides a view of a block device to a client operating system. The client-based driver dynamically works on a storage capacity of the virtual storage device by adding an extra online storage account to the plurality of online storage accounts, or by removing an outgoing online storage account of the plurality of online storage accounts from the plurality of online storage accounts.

In one embodiment, using the access key, the client-based driver (119) logs on to the first online storage account (101), and communicates with the first online storage by using the account configuration and a protocol associated with the account type and the first online storage account (101). The client-based driver (119) stores a data block (201) by automatically dividing the data block into multiple chunks (203). The client-based driver (119) uses mirroring, striping, or error correction for the storing the data block, identifying each of the multiple chunks with a topic.

In an embodiment, the client-based driver sends (205) a first chunk of the multiple chunks and the topic to the first online storage account to store the data block, maintaining a record in a table (207) for the topic, the first chunk, the first online storage account, and the dividing of the data block.

Figure 3:
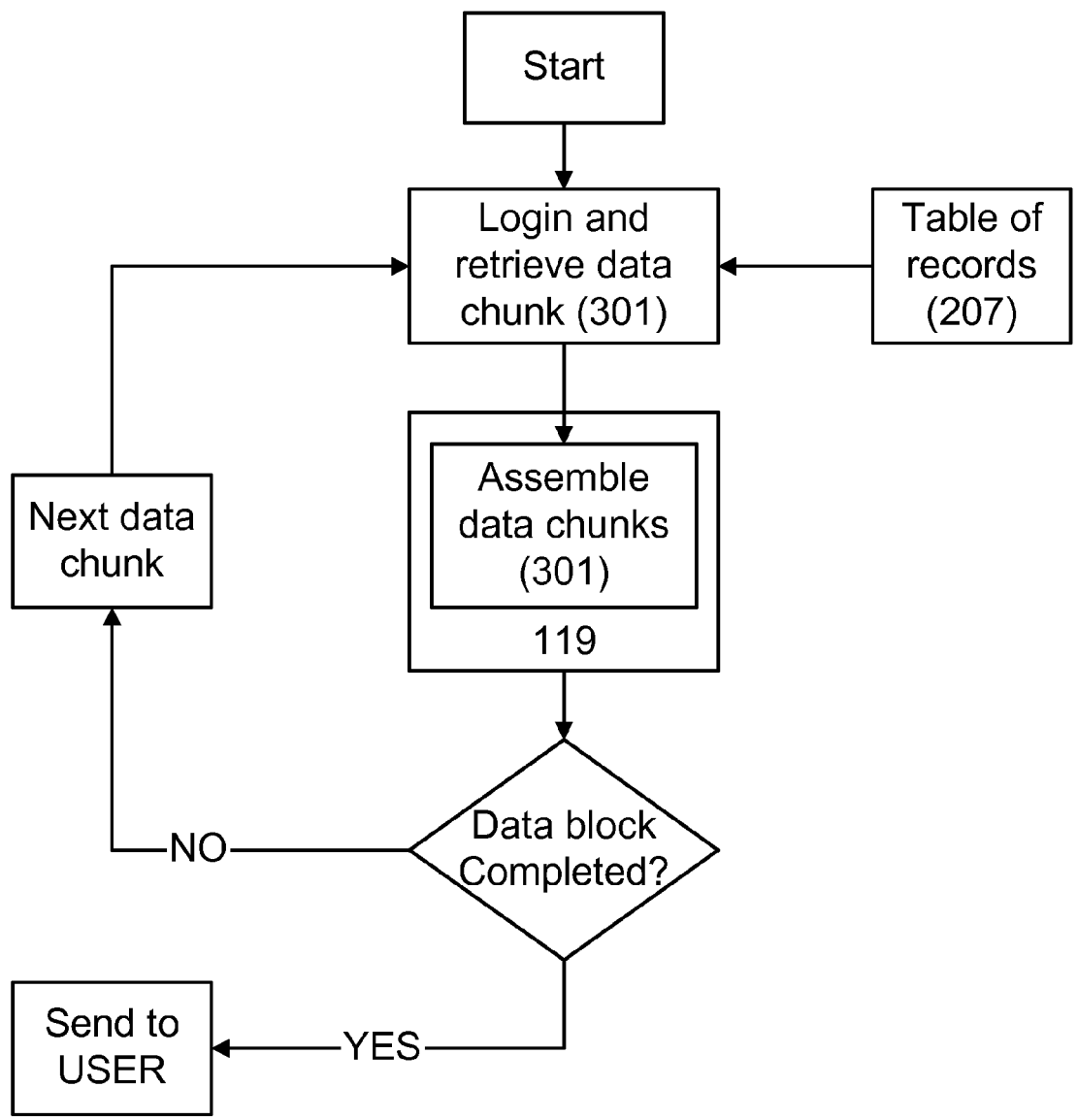
FIG. 3 is a data flow diagram showing how the data chunks are retrieved from several online storage accounts to form the original data block.

In one embodiment, as shown in FIG. 3, the client-based driver (119) retrieves (301) the data block associated with the topic by automatically checking the table (207) for the record to determine the first chunk, the first online storage account, and the dividing of the data block, receives the multiple chunks, and assembles (303) the multiple chunks back into the data block. If the user elects to backup the data block, the client-based driver backs up the data block associated with the topic. This is done by automatically checking the table (207) for the record to determine the first chunk, the first online storage account, and the dividing of the data block. After assigning a second online storage account of the plurality of online storage accounts for backup storage, a copy of the first chunk is forwarded to the second online storage account (103).

In one embodiment, if the user elects to delete the data block, the client-based driver deletes the data block associated with the topic by automatically checking the table (207) for the record to determine the first chunk, the first online storage account, and the dividing of the data block, and deletes the first chunk from the first online storage account.

A system, apparatus, or device comprising one of the following items is an example of the invention: storage device, virtual storage device, access key, storage account, account type, account configuration, client based driver, client operating system, data block, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of storage and its management.

Any variations of the above teaching are also intended to be covered by this patent application.

The invention claimed is:

1. A method of providing a virtual storage device from a plurality of online storage accounts, said method comprising:
   maintaining an access key for each first online storage account of said plurality of online storage accounts;
   wherein said first online storage account has an account type and an account configuration;
   wherein said account type is one of storage types, said storage types comprise of email type, photo type, music type, and social network type;
   wherein said access key is associated to a user, said access key is private to said user, and said plurality of online storage accounts are associated to said user;
   using a client-based driver for aggregating said plurality of online storage accounts into said virtual storage device;
   said client-based driver providing a view of a block device to a client operating system;
   said client-based driver dynamically sizing a storage capacity of said virtual storage device by adding an extra online storage account to said plurality of online storage accounts, or by removing an outgoing online storage account of said plurality of online storage accounts from said plurality of online storage accounts;
   said client-based driver logging on to said first online storage account by said access key;
   said client-based driver communicating with said first online storage by using said account configuration and a protocol associated with said account type and said first online storage account;
   said client-based driver storing a data block by automatically dividing said data block into multiple chunks;
   wherein said client-based driver uses mirroring, striping, or error correction for said storing said data block;
   identifying said each of said multiple chunks with a topic;
   said client-based driver sending a first chunk of said multiple chunks and said topic to said first online storage account for said storing said data block;
   maintaining a record in a table for said topic, said first chunk, said first online storage account, and said dividing of said data block;
   said client-based driver retrieving said data block associated with said topic by automatically checking said table for said record to determine said first chunk, said first online storage account, and said dividing of said data block, receiving said multiple chunks, and assembling said multiple chunks back into said data block;
   if said user elects to backup said data block, said client-based driver backing up said data block associated with said topic by automatically checking said table for said record to determine said first chunk, said first online storage account, and said dividing of said data block, assigning a second online storage account of said plurality of online storage accounts for backup storage, and forwarding a copy of said first chunk to said second online storage account; and
   if said user elects to delete said data block, said client-based driver deleting said data block associated with said topic by automatically checking said table for said record to determine said first chunk, said first online storage account, and said dividing of said data block, and deleting said first chunk from said first online storage account.

* * * * *